Jan. 19, 1960     F. F. SEGESMAN     2,922,102
ELECTRICAL WELL LOGGING

Filed April 10, 1956                     2 Sheets-Sheet 1

INVENTOR.
FRANCIS F. SEGESMAN.
BY William L. Sherman
HIS ATTORNEY

Jan. 19, 1960  F. F. SEGESMAN  2,922,102
ELECTRICAL WELL LOGGING
Filed April 10, 1956  2 Sheets-Sheet 2

INVENTOR.
FRANCIS F. SEGESMAN
BY William R. Sherman
HIS ATTORNEY

United States Patent Office 2,922,102
Patented Jan. 19, 1960

2,922,102

ELECTRICAL WELL LOGGING

Francis F. Segesman, Ridgefield, Conn., assignor, by mesne assignments, to Schlumberger Well Surveying Corporation, Houston, Tex., a corporation of Texas Application April 10, 1956, Serial No. 577,236

17 Claims. (Cl. 324—1)

The present invention relates to apparatus for electrical well logging and more particularly to new and improved apparatus for obtaining indications of the electrical resistivity of earth formations traversed by a borehole.

The resistivity of earth formations has, for some time past, been measured by introducing a steady survey current into such formations and determining one or more potential differences produced by the current flow. Highly sensitive and accurate records of formation resistivities are now secured in accordance with accepted oil field practice using apparatus of the types disclosed, for example, in H. G. Doll Patents Nos. 2,712,627, 2,712,628 and 2,712,629, issued July 5, 1955. Formation resistivities to which such apparatus accurately responds may vary from a few ohm-meters to 10,000 or more ohm-meters. To obtain a complete, readable log over such a range of resistivity values, novel techniques are now successfully employed by which are obtained large scale, substantially linear indications of low resistivity values and compressed scale, non-linear indications of high resistivity values.

Such a presentation of resistivity indications may be obtained in accordance with the teachings of F. P. Kokesh application Serial No. 491,762, filed March 30, 1954, for "Electrical Well Logging," now Patent No. 2,776,402, granted January 1, 1954, by coupling to the main electrode, from which survey current is emitted into the formations, suitable passive impedance means serving to decrease the survey current with increasing formation resistivity. This decrease in the survey current limits the rise of a potential difference representing formation resistivity asymptotically to a maximum signal corresponding to infinite formation resistivity. By setting the sensitivity of a resistivity indicating device for a full scale reading when such maximum signal is applied, a scale reading from zero to infinity and compressed systematically at its upper end may be derived.

The accuracy of this system for obtaining a compressed scale presentation may be affected by the polarization potential at the interface of the main electrode and well liquids in contact with the main electrode. In systems where it is desirable to employ a relatively small main electrode, as will generally be the case in apparatus of the type disclosed in above-mentioned Patent No. 2,712,-629, the polarization potential may have a magnitude which, in some instances, affects the accuracy of compressed scale indications obtained to an appreciable degree.

With apparatus of the type shown in the above-mentioned Doll patents, high current demands may be imposed upon an auxiliary current source when used to concentrate the survey current under severe borehole conditions. Even in resistivity logging systems of the type shown in Schuster application Serial No. 292,073, filed June 6, 1952, now Patent No. 2,770,771, granted November 13, 1956, for "Well Logging Methods and Apparatus," wherein the auxiliary current may remain constant, extreme resistivity conditions may impose severe requirements. It may be observed that accuracy of resistivity indications for high formation resistivities is important both in establishing the zero point for a reciprocal conductivity scale and to ensure against irregularities on a log of resistivity values, such as an indication of resistivity values in excess of infinity.

Accordingly, it is an object of this invention to provide new and improved electrical logging apparatus for obtaining clear and accurate indications of formation resistivity over a wide range of conditions.

Another object of the present invention is to provide such apparatus wherein resistivity indications are obtained on a scale which is substantially compressed for higher resistivity values.

Still another object of this invention is to provide such apparatus wherein survey current introduced into subterranean formation to obtain indications of apparent formation resistivity is systematically diminished with increasing values of apparent formation resistivity, whereby the distribution of the survey current may more readily be controlled.

These and other objects are attained, in accordance with the invention, by reducing the survey current emitted from a main electrode in response to increases in a measure signal derived to represent formation resistivity. To obtain the measure signal, auxiliary current is emitted from an auxiliary electrode having portions spaced above and below the main electrode. Potential differences produced by the survey and auxiliary currents are then suitably combined to yield the measure signal. Because increases in the measure signal with increasing formation resistivity are partially offset by a corresponding reduction in the survey current, correct indications of resistivity are obtained in response to the measure signal by using a scale of resistivity values compressed toward its upper end.

In one embodiment of the invention, a measure signal is derived representing the potential difference produced between a point in the vicinity of the main electrode and a remote reference point. In series opposition to a constant voltage source from which survey current is derived, a potential is applied proportional to the measure signal, systematically to reduce the survey current with increases in resistivity. In another embodiment, the measure signal serves to control the impedance of a shunt circuit to divert survey current from a constant current source coupled to the main electrode. The measure signal, in yet another embodiment of the invention, is derived by combining at least three components of potential difference, two of which are produced by the auxiliary current. Scale compression is obtained by diverting current from the survey current source.

The invention and others of its objects and advantages will be clearly perceived from the following detailed description of representative embodiments thereof, taken in conjunction with the accompanying drawings, in which.

In the figures, like reference numerals are employed to designate similar parts.

Figure 1:
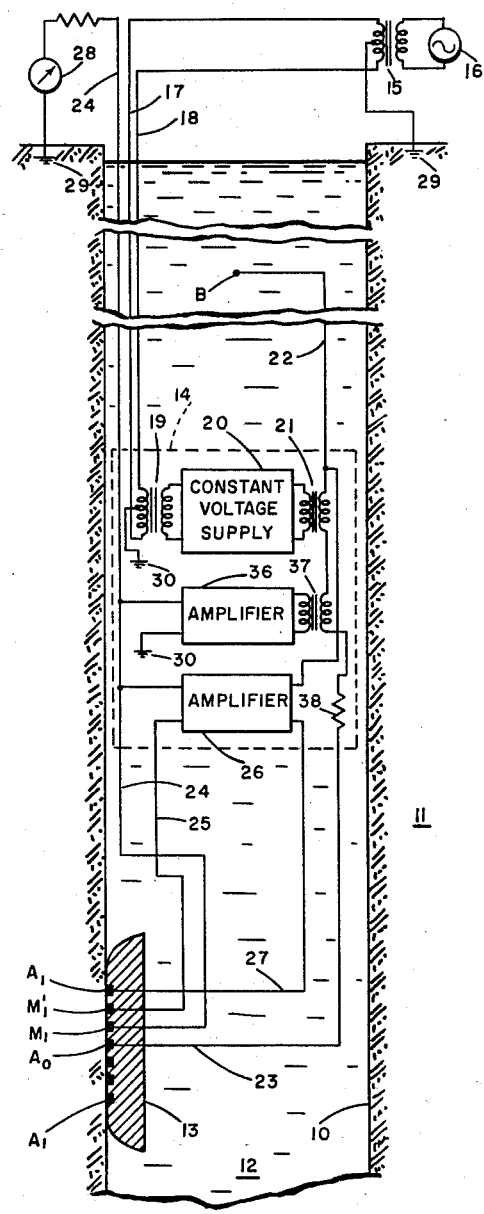
Fig. 1 is a schematic diagram of an electrical well logging system constructed in accordance with the invention.

In Fig. 1 is shown a borehole 10 passing through formations 11 and containing an electrically conductive weighting liquid 12, such as a so-called drilling mud.

Disposed within the borehole is a cushion member 13 having inlaid in its face the array of electrodes for electrical contact with the wall of the borehole. The cushion member 13 may be of the type disclosed in aforementioned Patent No. 2,712,629, and is composed of rubber or other flexible insulating material to conform and seal with the wall of the borehole. The cushion member 13 is adapted to be moved longitudinally through the borehole with a lateral force applied to it tending to urge its face against the borehole wall thereby to force the conductive liquid 12 from regions intermediate the electrodes. Arranged for movement with the cushion member 13 is a fluid-tight housing 14 containing electronic circuitry. Conventional means, such as a winch and cable (not shown) may be provided to support the cushion member 13 and housing 14 for travel through the borehole.

The electrodes carried by the cushion member 13 include a main electrode $A_0$ for passing survey current from the borehole into contiguous formations, an auxiliary electrode $A_1$ surrounding main electrode $A_0$ for emitting an auxiliary current, and monitoring electrodes $M_1$ and $M_1'$ differently spaced intermediate the auxiliary and main electrodes for detecting potential differences in the vicinity of the electrodes $A_0$ and $A_1$. The electrodes are arranged to be confocal or concentric about the electrode $A_0$. Remote from the electrodes carried by the cushion member 13 is a reference electrode B providing a current return point or ground.

By means of a transformer 15, an electric power source 16 at the surface is coupled to cable conductors 17, 18 which, in turn, are coupled by a transformer 19 to a constant voltage supply 20 within the housing 14. The output of the constant voltage supply 20 is coupled by a transformer 21 to a circuit including a conductor 22 connected to the current return electrode B and a conductor 23 connected to the main electrode $A_0$. This circuit is energized by a constant potential induced across the secondary winding of transformer 21 to pass survey current from the main electrode $A_0$ into the contiguous formations 11 and to collect it at remote electrode B.

To control the distribution of survey current emitted from the electrode $A_0$, a region of zero potential gradient surrounding the path of the survey current and extending transversely of the borehole wall is produced by passing auxiliary current from the auxiliary electrode $A_1$ of such intensity and phase as to reduce the potential difference between the electrodes $M_1$ and $M_1'$ substantially to zero. Such reduction of the potential difference between electrodes $M_1$ and $M_1'$ is effected by a degenerative feedback loop. To provide this feedback loop, the electrodes $M_1$, $M_1'$ are connected by conductors 24, 25, respectively, to the input terminals of a conventional high gain amplifier 26. One output terminal of amplifier 26 is connected via conductor 22 to the current return electrode B, while the other terminal is connected by conductor 27 to the auxiliary electrode $A_1$. The auxiliary current output of the amplifier 26 is thus a feedback signal which is adjusted in accordance with the potential difference across monitoring electrodes $M_1$, $M_1'$ to drive this potential difference substantially to zero. A region of zero potential gradient is thereby obtained between electrodes $M_1$, $M_1'$ effectively bounding the survey current emitted from main electrode $A_0$.

Figure 2:
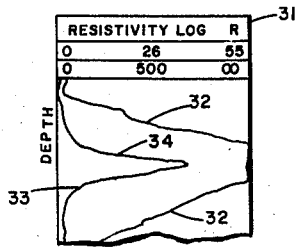
Fig. 2 is a plan view of a resistivity log illustrating the character of resistivity indications obtainable with systems constructed in accordance with the present invention.

As described in the above-mentioned Patent No. 2,712,629, resistivity values derived from measurements of a potential $e_m$ at the electrode $M_1$, or at any other point near the region where the null electric field is maintained, are representative of the actual resistivities encountered in the region underlying mud cake which may be formed on the borehole wall and extending a short distance beyond the borehole wall. To obtain indications of these resistivity values, a relatively high impedance potential measuring instrument 28 is connected between the electrode $M_1$ and ground 29 by means of insulated cable conductor 24. If desired, the measure signal $e_m$ supplied to instrument 28 may be an amplified version of the potential difference between electrode $M_1$ and an effectively remote reference point 30 connected to point 29 via cable conductors 17, 18. Preferably, the instrument 28 is of the recording type commonly used in electrical logging operations and thus may be a galvanometric recorder having a first sensitive unit and a second less sensitive unit. For ease of interpretation and correlation with other logs, the instrument 28 is arranged in accordance with the invention to provide a record 31 as shown in Fig. 2, in response to the measure signal $e_m$.

This record 31 displays a log of resistivity values as a function of the depth of electrode $A_0$ in the borehole 10 and has two scales or calibrations. The first scale covers low values of resistivity and is substantially linear, extending for example from "0" to "55" ohm-meters. Typifying resistivity values recorded in accordance with this scale with the first unit of higher sensitivity is the curve 32. To indicate the slight degree of non-linearity present in the first scale, the mid-scale and full scale values "26" and "55" may be compared with the corresponding values "25" and "50" for a conventional linear scale. Using the second, less sensitive unit of the galvanometric recorder 28, a second scale is obtained covering resistivity values R from zero to infinity. The mid-scale value $R_{ms}$ is indicated as 500 ohm-meters and the full scale value $R_{fs}$ corresponds with infinite resistivity, being obtained in response to a maximum measure signal $E_m$. Recorded with this lower sensitivity is a curve 33 of resistivity values which includes portions 34 exceeding the maximum value (e.g., 55 ohm-meters) for the first, more sensitive scale. While the substantially linear scale is available for the low values of resistivity which are most used in a quantitative interpretation of the record, its limited range precludes a ready correlation with other logs. The curve 33 recorded against the less sensitive, full range scale, on the other hand, is well adapted for correlation with other logs since it is continuous and since it approaches linearity for values below the mid-scale value.

For a scale compressed in accordance with the present invention, the following hyperbolic relationship gives the percentage deflection $d$ of the scale indication from the zero end:

$$(1) \qquad d = \frac{R}{R + R_{ms}}$$

where R is the indicated resistivity and $R_{ms}$ is the mid-scale value of resistivity indications. As the percentage deflection $d$ is equal to the ratio of the measure signal $e_m$ to its full scale value $E_m$, it follows that correct indications of apparent formation resistivity $R_a$ are obtained by causing this ratio to vary in accordance with the expression:

$$(2) \qquad e_m/E_m = \frac{R_a}{R_a + R_{ms}}$$

whereupon the resistivity indications R equal the apparent formation resistivity $R_a$.

There is provided in accordance with the present invention an arrangement for systematically diminishing the survey current as the apparent formation resistivity increases, whereby the measure signal supplied to the instrument 28 represents the apparent formation resistivity $R_a$ in accordance with Expression 2 given above. For an accurate scale of resistivity values, the measure signal $e_m$ which is supplied to the recording instrument 28 controls the amount by which the magnitude of the survey current is diminished.

This control is provided, in accordance with the invention, by connecting the input terminals of a conventional amplifier 36 to the conductor 24 and to remote reference point 30, respectively. The output of the amplifier 36, which is an amplified version of the measure signal $e_m$ supplied to the instrument 28, is coupled via transformer 37 to the survey current circuit, the secondary winding of the transformer 37 being connected for series opposition to the constant voltage induced in the secondary winding of transformer 21. That is, taking the potential induced in the secondary winding of transformer 21 as having a reference phase angle, the voltage induced in the secondary winding of transformer 37 has an opposing or 180° phase relationship therewith. Connected in the survey current circuit intermediate the main electrode $A_0$ and the secondary winding of transformer 37 is a series impedance 38, which may, for example, be a linear resistor of fixed value $R_1$. With an exemplary value of 20 volts output from supply 20, suitably the resistor 38 has a relatively high value such as 20 kilohms in order that the potential of electrode $A_0$ may not appreciably affect the magnitude of the survey current despite variations in formation resistivity. Thus, any decrease in the survey current supplied to the electrode $A_0$ is determined by the magnitude of the measure signal supplied to the recording instrument 28 in order that accurate records of formation resistivity may be obtained independently of variations in the potential of electrode $A_0$.

The value of survey current $i_o$ passed through resistor 38 of value $R_1$ by the difference in the regulated potential $E_o$ and the amplified measure signal $Ge_m$ is as follows:

(3) $$i_o = \frac{E_o - Ge_m}{R_1}$$

In accordance with a well-known formula, (4) $$i_o = K\frac{e_m}{R_a}$$

where K is a constant dependent in value upon the geometrical arrangement of the electrodes. When combined, Expressions 3 and 4 may be stated as:

(5) $$e_m = E_o/G\left(\frac{R_a}{R_a + KR_1/G}\right)$$

By setting the ratio $E_o/G$ equal to the maximum measure signal $E_m$ for a full scale deflection and $KR_1/G$ equal to the desired mid-scale value, Expression 5 becomes identical with Expression 2 and the desired compressed scale is obtained. Accordingly, as apparent formation resistivity $R_a$ increases, the measure signal $e_m$ increases toward its maximum value for a corresponding deflection $d$. At the same time, the survey current $i_o$ diminishes toward zero.

In an operation of the well logging system shown in Fig. 1, survey current is passed from the main electrode $A_0$ into the contiguous formations while the cushion member 13 together with housing 14 is moved through the borehole over a range of depths for which resistivity indications are desired. An electric field is thereby established within the formations 11 outwardly of the cushion member 13. As a result, a potential difference is created across electrodes $M_1$, $M_1'$ which is amplified in accordance with the transconductance of amplifier 26 to produce a flow of auxiliary current from the auxiliary electrode $A_1$ in phase with the survey current and of a magnitude tending to diminish the potential difference to zero. At the same time, the potential difference produced between electrode $M_1$ and ground is supplied as a measure signal $e_m$ to amplifier 36 to impress an amplified potential difference $Ge_m$ across the secondary of transformer 37 which is in phase opposition to the survey current. Depending upon the magnitude of the potential difference or measure signal $e_m$ which represents the apparent formation resistivity, the survey current $i_o$ is diminished from its maximum value $I_o$. By the operation of the feedback loop including amplifier 26, the auxiliary current is similarly diminished while maintaining a zero potential difference in the region of measuring electrodes $M_1$, $M_1'$.

By the action of the feedback loop which adjusts the survey current as a function of the apparent formation resistivity and by the action of the feedback loop which maintains a zero potential difference between electrodes $M_1$, $M_1'$, then, the potential difference or measure signal $e_m$ representing the formation resistivity affords an accurate indication of resistivity in accordance with a systematic variation of the survey current. This systematic variation of survey current $i_o$ may be represented by a hyperbolic function of apparent formation resistivity $R_a$:

(6) $$i_o = \frac{I_o}{1 + \frac{G}{R_1 K} R_a}$$

whereby the survey current varies from its maximum value $I_o$ asymptotically toward zero with increasing values of apparent formation resistivity $R_a$. In accordance with the further hyperbolic Expression 2 given above, the measure signal $e_m$ supplied to the recording instrument 28 representing the apparent formation resistivity varies from zero asymptotically to a maximum value $E_m$ with increasing values of apparent formation resistivity. Since the maximum value $E_m$ which this measure signal may have corresponds with infinite formation resistivity, the curve 33 of variations in this measure signal conveniently is recorded by the less sensitive galvanometer unit as a function of depth against the scale varying from zero to infinite formation resistivity. Using the galvanometer unit having a higher sensitivity, for example, ten times greater, the curve 32 is simultaneously recorded against a substantially linear scale on the record 31. In this manner there is obtained both a curve of widely varying resistivity values susceptible to quick visual examination and a curve for low resistivity values well suited to accurate analysis.

Figure 3:
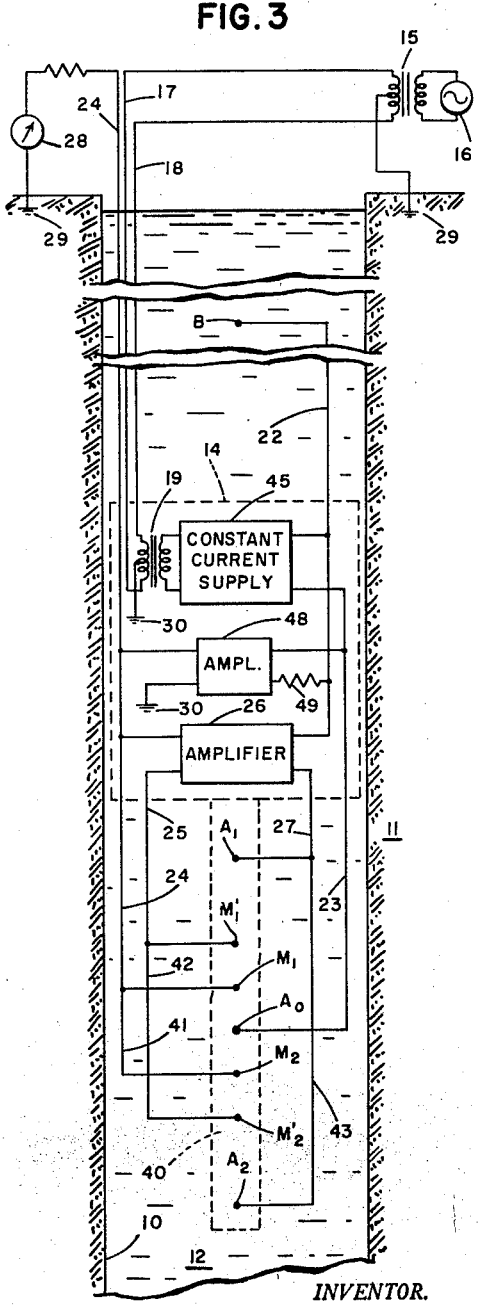
Fig. 3 is a schematic diagram similar to Fig. 1 and representing another embodiment of the invention.

The invention is not limited to the employment of an electrode array of the type disclosed in aforementioned Doll Patent No. 2,712,629. Thus, there is shown in Fig. 3 another embodiment of the invention employing an electrode array 40, in this instance of the type disclosed in aforementioned Doll Patent No. 2,712,627. This electrode array 40 comprises a main electrode $A_0$ for the survey current, an auxiliary electrode including portions $A_1$ and $A_2$ longitudinally spaced respectively above and below the main electrode $A_0$ for the purpose of introducing auxiliary current, and monitoring electrodes differently spaced intermediate the main and auxiliary electrodes and arranged as a pair $M_1$, $M_1'$ spaced above main electrode $A_0$ and a pair $M_2$, $M_2'$ spaced below the electrode $A_0$. Thus the electrode array 40 is symmetrical about the main electrode $A_0$, the monitoring electrodes $M_1'$, $M_2'$ being spaced outwardly of electrodes $M_1$, $M_2$ and electrodes $A_1$, $A_2$ being spaced outermost. Electrical symmetry is obtained with the array 40 by connecting the symmetrically spaced portions of the electrodes together through very low resistance conductors 41, 42 and 43.

In the embodiment of Fig. 3, a constant current supply 45 is employed to deliver survey current to the electrode $A_0$. The constant current supply 45 has one terminal connected by conductor 22 to remote electrode B and the other terminal connected by conductor 23 to main electrode $A_0$. The constant current supply 45 may comprise a high resistance in series with a regulated voltage source, for example, a 20 kilohm resistor in series with a 20 volt source, although constant current sources of other types may suitably be employed.

To create regions of zero potential gradient extending transversely of the borehole above and below the main electrode, the electrodes $M_1$, $M_2$ are connected to one input terminal of the feedback amplifier 26, while electrodes $M_1'$, $M_2'$ are connected to the other input terminal. These connections effected by conductors 24 and 25, respectively, impress upon the input of the amplifier 26 a potential difference which is driven toward zero by auxiliary current derived from the output of the amplifier 26 and supplied via conductor 27 to the auxiliary electrode $A_1$, $A_2$.

In order that the survey current may be diminished with increasing values of apparent formation resistivity, the potential difference between a point, such as at electrode $M_1$, and an effectively remote reference point 30 is applied to the input of an amplifier 48. The amplifier output is series-connected with resistor 49 in shunt across current supply 45. The amplifier 48 may, for example, be a grid-controlled triode or pentode having resistor 49 in its cathode circuit and a blocking capacitor in its anode output circuit. To obtain records of the type shown in Fig. 2, the transconductance of the amplifier is adjusted to equal $I_0/E_m$, where $I_0$ is again the maximum value of the survey current and $E_m$ is again the maximum measure signal applied to the amplifier input. In other words, the transconductance is such that the amplifier 48 diverts the entire current output of supply 45, leaving substantially zero survey current when the potential difference measured between electrode $M_1$ and ground represents substantially infinite apparent formation resistivity.

In an exemplary operation of the embodiment of the invention shown in Fig. 3, the electrode array 40 is moved through the borehole while survey current is introduced into the adjacent formations from electrode $A_0$. As in the embodiment of Fig. 1, the amplifier 26 tends to drive the potential difference between electrodes $M_1$ and $M_1'$ toward zero by adjusting the auxiliary current passed from electrodes $A_1$, $A_2$ into the borehole. At the same time, an amount of current from the constant current supply 45 is diverted from the survey current circuit by amplifier 48 in proportion to the measure signal derived as a potential difference between electrode $M_1$ and reference point 30. The same hyperbolic variations of survey current and resistivity signal with changes in apparent formation resistivity are thus obtained as may be obtained using the circuitry of Fig. 1. That is, the survey current is diminished toward zero and the resistivity measure signal increases asymptotically to its full scale value as apparent formation resistivity increases toward infinity.

Using a relatively high-valued cathode resistor 49, the amount of current diverted by the amplifier 48 is substantially independent of the potential of electrode $A_0$ with respect to ground. As a result, the survey current is rendered relatively independent of variations in the potential of the main electrode $A_0$, whereby the accuracy of resistivity measurements obtained no longer is affected by variations in this potential due, for example, to electrode polarization. Accordingly, the recorded indications of resistivity obtained with the instrument 28 quite accurately reflect the true resistivities encountered along the path of the survey current extending to a considerable lateral distance beyond the wall of the borehole. The nature of these resistivity indications may be more fully understood by reference to the above-mentioned Patent No. 2,712,627.

Figure 4:
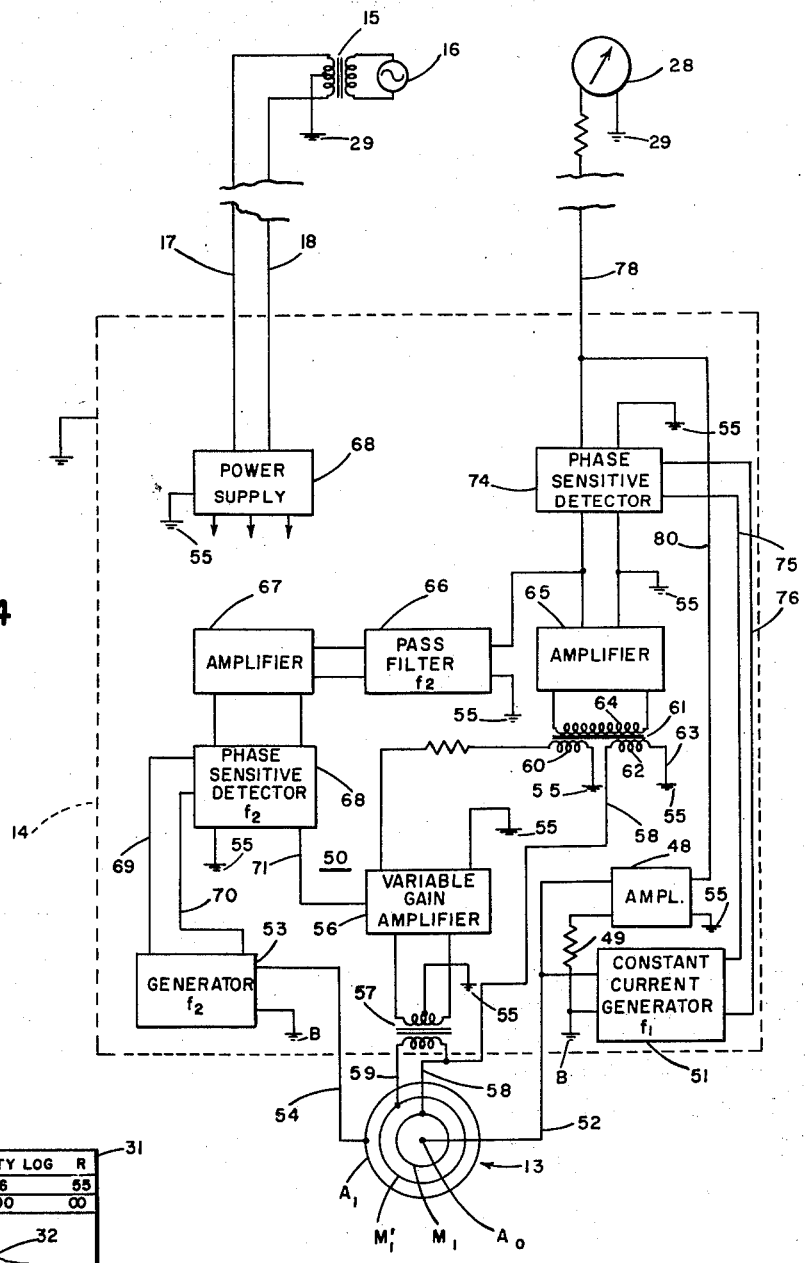
Fig. 4 is a schematic circuit diagram representing yet another embodiment of the invention in which illustration of a borehole is omitted for convenience.

In another embodiment of the invention, which is shown in Fig. 4, the survey and auxiliary currents are emitted with distinguishable time characteristics, not to obtain a controlled current distribution but to derive a normal and inverse signal $e_{ns}$ and $e_{is}$ produced by the survey current and a normal and an inverse signal $e_{na}$ and $e_{ia}$ produced by the auxiliary current. As taught in the above-mentioned Schuster Patent No. 2,770,771, these separate potential differences $e_{ns}$, $e_{na}$, $e_{is}$, and $e_{ia}$ (therein referred to as, $e_1$, $e_2$, $e_1'$ and $e_2'$) may be combined in a manner yielding the same indications of resistivity as if the survey current from the main electrode were actually being forced into the formations in a path predetermined in accordance with the teachings of the Doll Patents Nos. 2,712,627 and 2,712,629. The relationship which is found to exist between the apparent formation resistivity $R_a$ and these separate potential differences is expressed as follows:

$$(7) \qquad R_a \propto e_{ns} + e_{is}\frac{e_{na}}{e_{ia}}$$

Thus, the apparent formation resistivity may be obtained by a computation wherein the inverse signal $e_{is}$ arising from the survey current is amplified by the ratio of the normal and inverse signals $e_{na}$ and $e_{ia}$ attributable to the auxiliary current, and to this amplified signal is added the normal signal $e_{ns}$ due to the survey current.

Referring now to Fig. 4, a computer 50 for solving Expression 7 set forth above is conveniently disposed in the housing 14 for movement with the electrode array 13 through the borehole, although the computer may, if desired, be disposed at the surface of the earth. Within the housing, circuitry is provided for establishing the potential differences $e_{ns}$, $e_{is}$, $e_{na}$ and $e_{ia}$ in a manner facilitating separation of these potentials from one another. Thus, a constant current generator 51 for supplying survey current at the constant frequency $f_1$ is connected through an insulated conductor 52 to the main electrode $A_0$. The survey current emitted from electrode $A_0$ is returned to the generator 51 via electrode B which may, for example, be on the exterior of the housing 14. A second current generator 53 is connected by conductor 54 to supply auxiliary current at a second frequency $f_2$ to the outer electrode $A_1$. This auxiliary current may be returned to the generator 53 through electrode B, which is electrically remote from the array of electrodes $A_0$, $M_1$, $M_1'$ and $A_1$.

With survey and auxiliary current passing from the main and auxiliary electrodes $A_0$ and $A_1$, respectively, there exists between electrodes $M_1$ and $M_1'$ a potential difference $e_{is}$ at the frequency $f_1$ and a potential difference $e_{ia}$ at the frequency $f_2$ representing the respective inverse signals. Between electrode $M_1$ and an effectively remote reference ground point 55 there exists a potential difference $e_{ns}$ at the frequency $f_1$ and a potential difference $e_{na}$ at the frequency $f_2$ representing the normal signals produced, respectively, by the main and auxiliary currents. Taking the electrode $M_1$ as a reference point, the phase or polarity of the potential $e_{ia}$ is opposite or negative that of the potential $e_{na}$ while the potential $e_{is}$ is of like phase or polarity with respect to the potential $e_{ns}$.

To compute the apparent formation resistivity $R_a$ from the above Expression 7, the ratio of the normal and inverse signals due to the auxiliary current, that is, $e_{na}/e_{ia}$ is represented by the gain $G_1$ of a variable gain amplifier 56. Adjustment of this gain to equal such ratio is accomplished through a feedback loop responsive only to the signals at frequency $f_2$, which makes the product of the gain $G_1$ of amplifier 56 and the inverse signal $e_{ia}$ equal to the normal signal $e_{na}$. To apply the inverse signals $e_{is}$ and $e_{ia}$ to the input of the variable gain amplifier 56, an input transformer 57 has its primary winding connected by conductors 58 and 59, respectively, with the electrodes $M_1$ and $M_1'$. The inverse signal $e_{ia}$ appearing across the monitoring electrodes $M_1$, $M_1'$ is coupled by transformer 57 to the input of amplifier 56 for amplification by the gain $G_1$ and is supplied as the output of the variable gain amplifier 56 to a primary winding 60 of transformer 61. The transformer 61 has a second primary winding 62 having its terminals connected to electrode $M_1$ and remote reference point 55 via conductors 58, 63. Thus, the primary winding 62 is impressed with the normal signal $e_{na}$ produced by the auxiliary current.

In secondary winding 64 of transformer 60 which connects with the input of a constant gain amplifier 65, the algebraic summation of signals at frequency $f_2$ in the primary windings 60, 62 is induced proportional to $e_{na} - G_1 e_{ia}$ where the negative sign represents phase opposition of the induced signals. The amplifier 65 thus supplies an amplified version of this difference signal referred to ground point 55 to a pass filter 66 for the frequency $f_2$, which substantially eliminates signals of the frequency $f_1$ from the feedback loop. The signal transmitted by the filter 66 is amplified in an amplifier 67 which may be tuned at frequency $f_2$ and then is rectified by a phase sensitive detector 68. By connecting the phase sensitive detector 68 via conductors 69, 70 to the generator 53, the detector is rendered sensitive to signals at the frequency $f_2$ and serves further to reject signals of other frequencies. The phase sensitive detector 68 may be of any conventional design such as is disclosed in an article by N. A. Schuster at pages 254–255 of the "Review of Scientific Instruments," volume 21, for April, 1951. The output of the phase sensitive detector 68 is a rectified version of the amplified difference signal, which is supplied degeneratively via conductor 71 to the gain control section of the variable gain amplifier 56. The gain of the variable gain amplifier 56 is thus adjusted to minimize the gain control signal, that is, to make the expression $e_{na} - G_1 e_{ia}$ approach zero by an adjustment of $G_1$.

In addition to the signal at frequency $f_2$, the amplifier 65 is supplied with a signal at frequency $f_1$ proportional to $e_{ns} + G_1 e_{is}$. The output of amplifier 65 is coupled, not only to the pass filter 66, but also to a phase sensitive detector 74 which may be similar in design to phase sensitive detector 68. The phase sensitive detector 74 is, however, supplied with a reference signal at frequency $f_1$ from the generator 51 via conductors 75, 76. By means of cable conductor 78 and a ground return circuit through conductors 17, 18, the output of the phase sensitive detector 74 is connected to the indicating device 28. As will be explained more fully hereafter, the rectified signal supplied by the phase sensitive detector 74 is proportional to the apparent formation resistivity $R_a$ in accordance with Expression 7 given above. The potential supplied to indicating device 28 is then the measure signal $e_m$ corresponding to apparent formation resistivity.

In accordance with the principles of this invention, the survey current from the constant current generator 51 is diminished from an initial maximum value $I_0$ by an amount proportional to this measure signal $e_m$. To this end, amplifier 48 has its input terminals connected via conductor 80 and ground to the output terminals of phase sensitive detector 74 and has its output circuit connected in series with resistor 49 and in shunting relation to the output of generator 51. The gain of amplifier 48 is such that the survey current emitted from main electrode $A_0$ diminishes toward zero as the formation resistivity indicated by the device 28 increases toward infinity, just as in the system of Fig. 3.

To energize the current generators 51 and 53, as well as the other circuitry within the housing 14, a conventional power supply 80 may be disposed within the housing and have connection via cable conductors 17, 18 with the alternating current generator 16 at the surface of the earth.

In an exemplary operation of the apparatus of Fig. 4, the electrode array together with the housing 14 is moved longitudinally through the borehole while survey current at the first frequency $f_1$ is passed from the main electrode $A_0$ into the formations to be investigated. Auxiliary current at the second frequency $f_2$ is simultaneously passed from the auxiliary electrode $A_1$ into the formations. At any given depth, the survey and auxiliary currents produce corresponding normal signals $e_{ns}$ and $e_{na}$ and inverse signals $e_{is}$ and $e_{ia}$ which characterize the apparent formation resistivity $R_a$ in accordance with Expression 7 given above. The normal signals $e_{ns}$ and $e_{na}$, which are represented by the potential difference between measuring electrode $M_1$ and remote reference point 55, appear as potentials of different frequencies $f_1$ and $f_2$, respectively, across the primary winding 62. The inverse signals $e_{is}$ and $e_{ia}$, on the other hand, are derived from the measuring electrodes $M_1$, $M_1'$ and are amplified in amplifier 56 by the variable gain $G_1$, where $G_1$ may be taken as the same for signals of either frequency $f_1$ or $f_2$. The amplified signals $G_1 e_{is}$ and $-G_1 e_{ia}$ are then applied across primary winding 60 of transformer 61.

Considering only the signals at frequency $f_2$, the algebraic summation of such signals, that is, $e_{na} - G_1 e_{ia}$ is coupled by the transformer 61 via amplifier 65, filter 66 and amplifier 67 to the phase sensitive detector 68. From the detector 68, a rectified version of this signal is obtained which is supplied to the variable gain section of the amplifier 56 degeneratively so that the gain $G_1$ of the variable gain amplifier 56 tends to equal the ratio $e_{na}/e_{ia}$ as the components of the second frequency signals $e_{na}$ and $Ge_{ia}$ are forced toward equality. Accordingly, the inverse signal $e_{is}$ due to the survey current is amplified by the ratio $e_{na}/e_{ia}$ to yield a potential at frequency $f_1$ across the primary winding 60 equal to the second term of Expression 7. Correspondingly, in the other primary winding 62 the signal at the frequency $f_1$ is the normal signal $e_{ns}$ due to the survey current, which is a first term of Expression 7. Since these two signals are algebraically added in the secondary winding 64 of the transformer 61, an amplified version of the algebraic summation furnished to the phase sensitive detector 74 is proportional to $$e_{ns} + \left(\frac{e_{na}}{e_{ia}}\right) e_{is}$$

This rectified signal which is proportional to the apparent formation resistivity $R_a$ energizes the indicating device 28 to provide a continuous recording of apparent formation resistivity as a function of the depth of the electrode $A_0$ in the borehole.

It will be observed that the expression for apparent formation resistivity $R_a$ includes in each term a parameter ($e_{ns}$ or $e_{is}$) which is proportional to the magnitude of the survey current. At the same time, the parameters $e_{na}$ and $e_{ia}$ which should depend proportionally upon the magnitude of the auxiliary current appear only in the second term and as a ratio. Hence, the detected signal representing apparent formation resistivity is directly proportional to the magnitude of the survey current but is substantially unaffected by variations in the magnitude of the auxiliary current. In accordance with the invention, advantage is taken of the dependence of the measured value of resistivity upon the survey current to compress the scale of the resistivity indications or recordings for high values of resistivity.

Thus, in a manner similar to that described in connection with Fig. 3, a portion of the constant current from generator 51 is diverted through resistor 49. The amount of current diversion is determined by the measure signal on conductor 78 and is substantially independent of variations in the potential of main electrode $A_0$. In consequence, the indications of formation resistivity R obtained with depth in response to the measure signal may be calibrated in the manner shown in Fig. 2. Otherwise stated, the measure signal obtained in accordance with this invention asymptotically approaches a maximum value $E_m$ which may be a full scale value for the indicating device 28 representing infinite apparent formation resistivity. At one-half this maximum value, a resistivity indication may be obtained which is the same as the full scale indication obtained without provision for scale compression and using the same scale sensitivity. To give an example, an indicating instrument having a full scale sensitivity of 500 ohm-meters on a linear basis may have a mid-scale value of 500 ohm-meters when used with the system of this invention, the full scale indication being infinite resistivity. Thus, with the apparatus of Fig. 4, as with the apparatus of Figs. 1 and 3, readily interpreted records may be obtained of the type shown in Fig. 2.

Each of the described embodiments of the invention is substantially free of the adverse effects of polarization potentials, since the reduction of the survey current and compression of the scale indications depends upon potential differences measured at the electrodes $M_1$, $M_1'$ through which a negligible current is passed. Because the control loop which serves to reduce the survey current is actuated by the same signal as is supplied to the indicating device, the scale compression is consistent and follows an explicit mathematical relationship, namely, a hyperbolic function for the embodiments disclosed. The amount of survey current flowing from the main electrode $A_0$ may be made substantially independent of the potential of that electrode by employing a current supply or current generator having an open-circuit potential or electro-motive force an order of magnitude or more larger than the potential of the main electrode. To illustrate this point with exemplary values, the electro-motive force of the current source may be 20 volts with a series resistance of 20 kilohms, whereby the maximum survey current is 1 milliampere. With such values, it is unlikely that the potential of the electrode $A_0$ with respect to ground would ever exceed one volt. Generalizing, it will be observed that the survey current has a fixed maximum value determined by the regulated supply and, for any given value of apparent formation resistivity, has a value equal to the maximum value less an amount proportional to the apparent formation resistivity.

While several arrangements for causing the survey current to decrease from a maximum value in accordance with the measured formation resistivity have been shown, other arrangements may be utilized. For example, a current supply for the survey current may be energized in accordance with the difference between a reference potential and a potential proportional to the measured formation resistivity to provide a corresponding survey current output.

This invention may be used with electrode arrays other than those which have been illustrated. Thus, electrode arrays of the types shown in H. G. Doll Patents Nos. 2,712,628 and 2,712,630 may be employed, if desired. The electronic circuitry which has been shown conveniently disposed in the housing 14 may instead be located in part or entirely at the surface of the earth. While the invention has been illustrated by systems for deriving only a single type of resistivity measurement, it may be employed in combined resistivity measuring systems, such as the combined system shown and described in above-mentioned Patent No. 2,712,629.

As it is a characteristic of the resistivity indications obtained in accordance with this invention that a scale of values which are the reciprocals of the resistivity values will permit direct reading of conductivities, terms such as "resistivity indications" used herein are intended to embrace indications which are presented in relation to a conductivity scale. The invention is thus equally applicable to systems for obtaining indications of conductivity and, in fact, such conductivity scale would be compressed in a manner analogous to the resistivity scale compression heretofore considered in that the higher conductivity values would be compressed relative to the lower conductivity values. This points up a unique feature of the present invention, namely, that one and the same measurement curve, when plotted on a zero to infinity scale, serves as both a compressed resistivity curve and a compressed conductivity curve. What happens is that undesired degrees of amplitude variation, either too large or too small, occurring at the upper and lower ends of the resistivity and conductivity scales are changed to more moderate or intermediate degrees of variation having a more readily interpretable nature.

Accordingly, the invention is not intended to be limited to the specific embodiments shown and described but is of a scope defined in the appended claims.

I claim:

1. In apparatus for investigating earth formations traversed by a borehole, the combination comprising a main electrode adapted to be lowered into a borehole, main electric source means coupled to said main electrode and to a current return point for passing survey current from said main electrode into adjacent formations, an auxiliary electrode including portions spaced above and below said main electrode, auxiliary electric source means coupled to said auxiliary electrode and to a current return point for emitting auxiliary current from said auxiliary electrode, means responsive to at least one potential difference produced in the vicinity of said electrodes for deriving a measure signal representing the resistivity of formations opposite said main electrode, and electrical means coupled to said main source means and responsive to said measure signal for adjusting the magnitude of said survey current as a function of said measure signal.

2. In apparatus for investigating earth formations traversed by a borehole, the combination comprising a main electrode adapted to be lowered into a borehole, main electric source means coupled to said main electrode and to a remote current return point for passing survey current from said main electrode into adjacent formations and tending to maintain said survey current at a reference value, an auxiliary electrode including portions spaced above and below said main electrode, auxiliary electric source means coupled to said auxiliary electrode and to a remote current return point for emitting auxiliary current from said auxiliary electrode, means responsive to the potential difference between a point intermediate said electrodes and a remote reference point for deriving a measure signal representing the resistivity of formations opposite said main electrode, and electrical means responsive to said measure signal to diminish the flow of said survey current from said reference value as a function of said measure signal.

3. In well logging apparatus, the combination comprising a main electrode adapted to be lowered into a borehole, regulated electric source means coupled to said main electrode and to a remote current return point for passing survey current from said main electrode into adjacent formations and tending to maintain said current at a fixed maximum value, an auxiliary electrode including portions spaced above and below said main electrode in proximity thereto, auxiliary electric source means coupled to said auxiliary electrode and to a relatively remote current return point and responsive to potential difference between a pair of points spaced intermediate said electrodes for emitting auxiliary current from said auxiliary electrode tending to reduce to a reference value said potential difference, means responsive to the potential difference between a point in the vicinity of said pair of points and a remote reference point for providing a measure signal representing the resistivity of formations opposite said main electrode, and electrical means responsive to said measure signal and coupled to said regulated source means for diminishing the flow of said survey current from said maximum value as said measure signal increases.

4. In well logging apparatus, the combination comprising a main electrode adapted to be lowered into a well, regulated electric source means coupled to said main electrode and to a current return point remote from said main electrode for passing survey current from said main electrode into the surrounding earth formations, an auxiliary electrode including portions mounted above and below said main electrode, auxiliary electric source means connected to said auxiliary electrode and to a relatively remote current return point and responsive to the potential difference between a pair of points located at different positions intermediate said electrodes for emitting auxiliary current from said auxiliary electrode tending to reduce said potential difference substantially to zero, means responsive to the potential difference between a point in the vicinity of said pair of points and a remote reference point for providing a measure signal representing the resistivity of formations opposite said main electrode, variable electric source means having its output coupled in series with the output of said regulated electric source means and responsive to said measure signal for diminishing said survey current as said measure signal increases, and mean responsive to said measure signal for providing compressed scale indications of formation resistivity.

5. In well logging apparatus, the combination as defined in claim 4, wherein said variable electric source means comprises an amplifier.

6. In well logging apparatus, the combination comprising a main electrode adapted to be lowered into a well, regulated potential supply means connected to said main electrode and to a current return point remote from said main electrode for passing survey current from said main electrode into the adjacent earth formations, an auxiliary electrode including portions spaced above and below said main electrode, a first amplifier having its output coupled to said auxiliary electrode and to a relatively remote current return point and responsive to the potential difference between a pair of points located at different positions intermediate said electrodes for emitting auxiliary current from said auxiliary electrode to reduce said potential difference substantially to zero, a second amplifier having its output connected in series with said regulated potential supply means and said main electrode and responsive to the potential difference measured between a point in the vicinity of said main electrode and a remote reference point for diminishing said survey current as said measured potential difference increases, and means responsive to said measured potential difference for providing compressed scale indications of formation resistivity.

7. In well logging apparatus, the combination comprising a main electrode adapted to be lowered into a well, regulated supply means having an output potential $E_o$ coupled to said main electrode and to a remote current return point for passing survey current from said main electrode into the adjacent earth formations, a resistor serially connected between said supply means and said main electrode, amplifier means having its output coupled in series with said resistor and responsive to the potential difference measured between a point in the vicinity of said main electrode and a remote reference point for applying an amplified version of said measured potential in phase opposition to said output potential, an auxiliary electrode including portions spaced above and below said main electrode, auxiliary electric source means connected to said auxiliary electrode and to a relatively remote current return point and responsive to the potential difference between a pair of points located at different positions intermediate said electrodes for emitting auxiliary current from said auxiliary electrode with a polarity and magnitude tending to reduce to zero said last mentioned potential difference, and means for providing compressed scale indications in response to said measured potential difference including a full scale indication when said measured potential difference is equal to the ratio $E_o/G$ where G is the gain of said amplifier means.

8. In well logging apparatus, the combination comprising a main electrode and an auxiliary electrode including portions spaced above and below said main electrode mounted for movement together through a borehole, constant current supply means coupled to said main electrode and to a remote current return point for passing survey current from said main electrode into adjacent formations, auxiliary electric source means coupled to said auxiliary electrode and to a remote current return point for emitting auxiliary current from said auxiliary electrode, means responsive to the potential difference between a point in the vicinity of said main electrode and a remote reference point for deriving a measure signal representing the resistivity of formations adjacent said main electrode, and amplifier means having its output terminals coupled to said main electrode and to remote current return point for diverting more of said survey current as said measure signal increases.

9. In well logging apparatus, the combination comprising a main electrode adapted to be lowered into a well, constant current supply means connected to said main electrode and to a remote current return point for passing survey current from said main electrode into the adjacent earth formations, an auxiliary electrode including portions spaced above and below said main electrode, auxiliary electric source means connected to said auxiliary electrode and to a relatively remote current return point and responsive to the potential difference between a pair of points intermediate said electrodes for emitting auxiliary current from said auxiliary electrode tending to reduce said potential difference substantially to zero, means for providing compressed scale indications of the potential difference measured between a point in the vicinity of said main electrode and a remote reference point, and amplifier means having its output terminals coupled to said main electrode and to a remote current return point and responsive to said measured potential difference for diminishing said survey current from a fixed maximum value as said measured potential difference increases.

10. In well logging apparatus, the combination defined in claim 9, wherein said indicating means provides full scale indications in response to a measured potential difference equal to the ratio between the maximum value of said survey current and the transconductance of said amplifier means.

11. In well logging apparatus, the combination comprising a main electrode adapted to be lowered into a borehole, main electric source means coupled to said main electrode and to a remote current return point for passing survey current from said main electrode into adjacent formations, an auxiliary electrode including portions spaced above and below said main electrode, auxiliary electric source means coupled to said auxiliary electrode and to a current return point for emitting a separately different auxiliary current from said auxiliary electrode, computer means responsive to normal and inverse signals produced at a pair of points spaced in the vicinity of said electrodes for deriving a measure signal representing the resistivity of formations adjacent said main electrode, and electrical means coupled to said main source means and responsive to said measure signal to adjust the flow of said survey current as a function of said measure signal.

12. In well logging apparatus, the combination comprising a main electrode adapted to be lowered into a borehole, regulated electric source means connected to said main electrode and to a remote current return point for passing survey current from said main electrode into the surrounding earth formations, an auxiliary electrode including portions spaced above and below said main electrode, auxiliary electric source means connected to said auxiliary electrode and to a relatively remote current return point for emitting a separately different auxiliary current from said auxiliary electrode, computer means responsive to normal and inverse signals produced at a pair of points located at different positions intermediate said electrodes for providing a measure signal representing the resistivity of formations opposite said main electrode, means responsive to said measure signal for providing deflections with respect to a scale as indications of said resistivity, and amplifier means having its output terminals coupled to said regulated electric source means and responsive to said measure signal for diminishing said survey current as a function thereof.

13. In well logging apparatus, the combination as defined in claim 12 wherein said indicating means provides deflections with respect to a scale bearing resistivity values R and a mid-scale value $R_{ms}$ such that $$\frac{R}{R+R_{ms}}$$

is proportional to the deflection for a correct indication of formation resistivity.

14. In well logging apparatus, the combination comprising a main electrode adapted to be lowered into a well, constant current supply means connected to said main electrode and to a current return point remote therefrom for passing survey current from said main electrode into the adjacent earth formations, an auxiliary electrode surrounding said main electrode, auxiliary supply means connected to said auxiliary electrode and to a remote current return point for emitting a separately different auxiliary current from said auxiliary electrode, a pair of measuring electrodes spaced intermediate said main and auxiliary electrodes for detecting inverse signals produced by said survey and auxiliary currents, respectively, at least one of said measuring electrodes serving to detect normal signals produced as potentials with respect to a remote reference point by said survey and auxiliary currents respectively, a computer responsive to said signals for computing the sum of the normal signal produced by said survey current and the product of the remaining normal signal and the ratio of said inverse signals to derive a measure signal representative of the formation resistivity, means responsive to said measure signal for providing compressed scale indications of said resistivity, and amplifier means having its output terminals coupled to said main electrode and a remote current return point and responsive to said measure signal for diminishing said survey current as said measure signal increases.

15. In apparatus for investigating earth formations traversed by a borehole, the combination comprising: signal transmitting means adapted to be lowered into a borehole; means for energizing the signal transmitting means for enabling it to pass a survey signal into adjacent formations; signal receiving means positioned adjacent the signal transmitting means for deriving a measure signal representative of a characteristic property of the formations; and means responsive to the measure signal for adjusting the magnitude of the survey signal as a function of the measure signal, thereby to compress a desired range of measure signal values.

16. In apparatus for investigating earth formations traversed by a borehole, the combination comprising: means adapted to be lowered into a borehole for transmitting signal energy into adjacent earth formations; means responsive to the transmitted signal energy for developing a measure signal representative of a characteristic property of the formations; and means responsive to the measure signal for adjusting the transmitted signal energy as a function of the measure signal, thereby to compress a desired range of measure signal values.

17. In apparatus for investigating earth formations traversed by a borehole, the combination comprising: means adapted to be lowered into a borehole for transmitting signal energy into adjacent earth formations; means responsive to the transmitted signal energy for developing a measure signal representative of a characteristic property of the formations; indicating means for providing a visual indication of the measure signal; and means responsive to the measure signal for adjusting the transmitted signal energy as a function of the measure signal, thereby to compress a desired range of the visual indications.

References Cited in the file of this patent

UNITED STATES PATENTS

| | | |
|---|---|---|
| 2,729,784 | Fearon | Jan. 3, 1956 |
| 2,770,771 | Schuster | Nov. 13, 1956 |
| 2,776,402 | Kokesh | Jan. 1, 1957 |
| 2,803,796 | Schuster | Aug. 20, 1957 |